Jan. 24, 1939.　　　G. G. GARVIS　　　2,144,918
DOUBLE PURPOSE GRILL
Filed Sept. 23, 1937
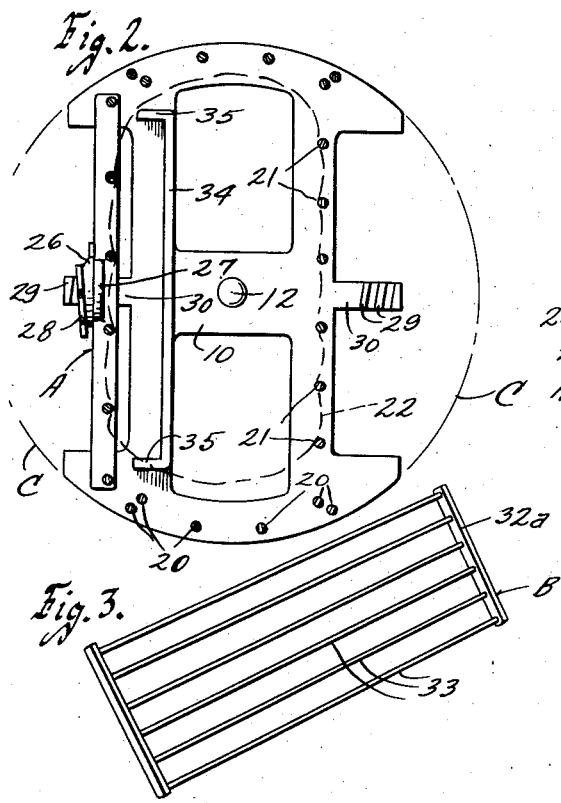
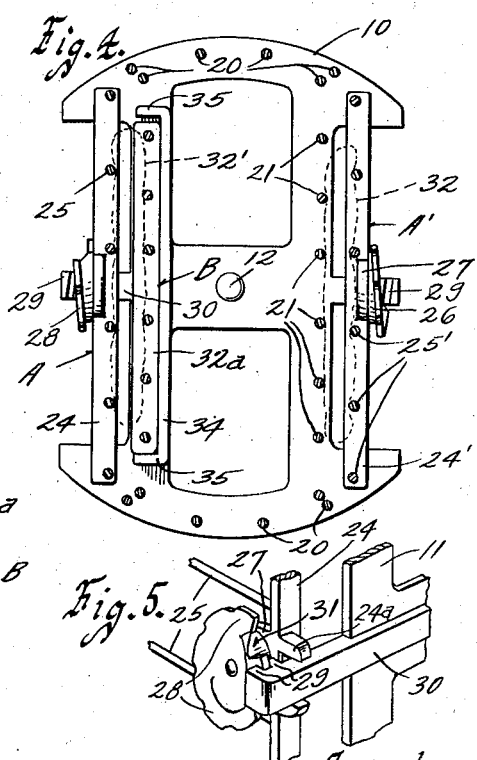
Witness
H. S. Munzenmaier
Inventor
Gus G. Garvis
by Bair & Freeman
Attorneys Patented Jan. 24, 1939

2,144,918

UNITED STATES PATENT OFFICE 2,144,918

DOUBLE PURPOSE GRILL

Gus G. Garvis, Des Moines, Iowa

Application September 23, 1937, Serial No. 165,361

14 Claims. (Cl. 53—5)

An object of my invention is to provide a grill structure of simple and inexpensive construction for the double purpose of grilling either relatively thick pieces of material, such as split or whole hams and chickens, chunks of beef and the like, or relatively thin pieces of material, such as steaks, weiners and ribs.

Another object is to provide a double purpose grill which can be loaded and unloaded while the grill is supported in a barbecue machine or the like, such as disclosed in my Patent No. 1,740,729, of December 24, 1929.

A further object is to provide a grill which is particularly adapted for use in a barbecue machine or the like, the grill being so arranged that material may be retained thereby within a circumferential line so that the material may be rotated in front of gas or electric heaters for the purpose of grilling or barbecuing such pieces of material.

Still a further object is to provide a grill structure which may be supported for rotation and which includes a substantially basket-like cage to receive large pieces of material and auxiliary means for supporting thin pieces of material in addition to the large piece of material, or supporting thin pieces only in such manner that sufficient space is left between them so that heat can enter between them and thus grill both the inside surfaces and the outside surfaces of the pieces of material so supported, without the necessity of having to turn them over during the grilling operation.

Still a further object is to provide a grill which supports two separate bodies of material so spaced relative to each other that they cooperate to baste each other during grilling or barbequing operations and thus I eliminate the necessity of any mechanical or manual means for accomplishing basting during the cooking of the material.

With these and other objects in view, my invention consists in the construction, arrangement and combination of the various parts of my grill, whereby the objects contemplated are attained, as hereinafter more fully set forth, pointed out in my claims, and illustrated in the accompanying drawing, in which:

Figure 1 is a front elevation of a double purpose grill embodying my invention, portions of a barbecuing machine for supporting the grill being illustrated in section.

Figure 2 is a sectional view on line 2—2 of Figure 1 omitting a removable grill plate.

Figure 3 is a perspective view of the removable grill plate omitted from Figure 2.

Figure 4 is a sectional view similar to Figure 2 showing the removable grill plate in position in the grill structure for using both sides of the grill; and Figure 5 is a perspective view of an enlarged adjusting means for one of the grill plates.

On the accompanying drawing I have used the reference numerals 10 and 11 to indicate end supports which are plate-like in character with portions thereof cut out to reduce the weight thereof. The end plates 10 and 11 are provided with means for rotatably supporting them. By way of example, the plate 10 has a stud 12 extending therefrom and terminating in a square head 13, while the plate 11 has a pointed stud 14 extending therefrom. The studs 12 and 14 are adapted for mounting in a barbecuing machine or the like, portions of which are shown in Figure 1, and which will now be described.

A bearing 15 is illustrated in which a drive shaft 16 is journaled. The shaft 16 may be driven from a motor or the like (not shown), a gear 17 being illustrated for providing an operative connection between such motor and the shaft 16. The shaft 16 has a socketed head 18 adapted to receive and rotate the head 13 and stud 12 for thus imparting rotation to the entire grill structure. The pointed stud 14 extends into a stationary socket or the like 19 and merely rotates relative thereto.

Connecting the supporting plates 10 and 11 together are a series of rod-like elements 20 and 21. These elements provide a basket-like cage or grill for reception of a large piece of material, such as a ham or the like indicated by dotted lines at 22 in Figure 2. For retaining the ham 22 in position, I provide a grill plate or closure member A comprising end bars 24 connected by rods 25.

The grill plate A is retained in position by rotary wedge means comprising discs 26 rotatably secured to the grills by being mounted upon projections 27 extending one from each of the end bars 24. The discs 26 have formed thereon spirally constructed flanges 28 which are notched as indicated at 31. Cooperable therewith on the plates 10 and 11 are slotted extension members 30 provided with projections 29 forming the slots. The projections 29 are adapted to enter the notches in the flanges so that the rim of the flanges may be received into the slots of the members 30. When the flanges are in the slots the discs or cams 26 may be rotated and the spiral flanges 28 will engage the projections 29 to force the grill plate inwardly and thereby compress the ham 22 or other material and tightly retain it in position against the bottom of the basket-like grill formed by the rods 21.

As shown at the right side of Figure 4, thin pieces of material, such as steaks or the like, may be supported for barbecuing or grilling. These are indicated at 32 and 32'. A second grill plate A', similar to the grill plate A, is used for the purpose of retaining the material 32 against the bottom rods 21 of the basket-like grill structure. The grill plate A' has parts corresponding to those of the grill plate A and bearing the same reference numerals with the addition of "'". The grill plate A' may be used for supporting thin pieces of material in addition to the thick one indicated at 22 in Figure 2, or the grill may be adjusted for supporting the two pieces of thin material 32 and 32a by the use of a third grill plate B. The grill plate B comprises end bars 32 and rods 33, the entire unit being removable relative to the grill structure.

For the purpose of supporting the grill plate B relative to the grill structure, I provide flanges 34 on the supporting plates 10 and 11 which terminate in flanges 35. The flanges 34 and 35 engage the side edges and ends, respectively, of the bars 32, as shown in Figure 4.

By supporting pieces of material 32 and 32' in spaced relation as illustrated in Figure 4, there is sufficient room between them for heat from the burner or heating element of the barbecuing machine to radiate between them and thus I have found that all four sides of the material may be properly browned without the necessity of having to turn the material over in the grill. The particular arrangement disclosed also provides a self-basting feature since the grease and water dripping from the material in one side of the grill when such material is uppermost will drop on the material on the other side of the grill. This reduces shrinkage of meats and the like and the meats cook more quickly and retain their natural juices and flavor. Also, my particular arrangement of the parts of the grill increases the capacity of the machine as compared with one where flat pieces of material are clamped between grill plates at the center of rotation.

Some changes may be made in the construction and arrangement of the parts of my device without departing from the real spirit and purpose of my invention, and it is my intention to cover by my claims any modified forms of structure or use of mechanical equivalents, which may be reasonably included within their scope.

I claim as my invention:

1. In a double purpose grill, a basket-like cage of substantially rectangular cross section having rods forming the bottom of the cage and having one side open, a grill plate for closing said side, a second grill plate cooperating with the bottom of said cage to support between them relatively thin pieces of material to be grilled, the entire cage and grill plates being arranged within a circumferential plane and means for supporting said cage and grill plates for rotation about substantially the center of such circumferential plane.

2. In a grill structure, a basket-like cage having rods forming a bottom for the cage and having one side open, a separate grill plate forming a closure for said open side, a second grill plate cooperating with the bottom of said basket-like cage to support between said second grill plate and said bottom relatively thin pieces of material to be grilled.

3. In a grill structure, a basket-like cage having a plurality of grill-like sides and having one side open, a separate grill plate forming a closure for said open side, a second grill plate cooperating with another of said sides to support between said second grill plate and said other side relatively thin pieces of material to be grilled, a third grill plate, means for supporting said third grill plate spaced between said other side and said first grill plate, said third grill plate being removable from said supporting means to enlarge the cage when the object to be grilled is to be positioned therein.

4. In a double purpose grill, a basket-like cage having a grill-like bottom and having one side open, a grill plate for closing said side, a second grill plate cooperating with the bottom of said basket-like cage to support between said second grill plate and said bottom relatively thin pieces of material to be grilled, a third grill plate, means for supporting said third grill plate spaced between said bottom and said first grill plate, said third grill plate being removable from said supporting means.

5. In a grill structure, a pair of spaced supporting members, means for supporting said members for rotation, a pair of spaced material-engaging grill plates mounted on said supporting members and a companion grill plate cooperable with each of said pair of material-engaging grill plates to retain the material to be grilled between the material-engaging grill plates and the companion grill plates, said companion grill plates being adjustable toward and away from said material-engaging grill plates.

6. In a grill structure, a pair of spaced supporting members, means for supporting said members for rotation, a pair of spaced independent material-engaging grill plates carried by said supporting members and individual companion grill plates independently cooperable one with each of said pair of material-engaging grill plates to retain the material to be grilled between the material-engaging grill plates and the companion grill plates, said companion grill plates being removably supported relative to said material-engaging grill plates.

7. In a grill structure, a pair of spaced supporting members, means for supporting said members for rotation, a pair of spaced material-engaging grill plates carried by said supporting members and a companion grill plate cooperable with each of said pair of material engaging grill plates to retain the material to be grilled between the material-engaging grill plates and the companion grill plates, said companion grill plates being movable toward and away from said material-engaging grill plates, and rotating wedge means for changing the adjustment between said companion grill plates and said material-engaging grill plates and for retaining the adjustment after it is changed.

8. In a grill structure, a pair of spaced supporting members, means for supporting said members for rotation, a pair of spaced material-engaging grill plates mounted on said supporting members and a companion grill plate cooperable with each of said pair of material-engaging grill plates to retain the material to be grilled between the material-engaging grill plates and the companion grill plates, said companion grill plates being movable relative to said material-engaging grill plates and means for changing and thereafter retaining the adjustment between said companion grill plates and said material-engaging grill plates.

9. In a grill structure, a pair of spaced supporting members, means for supporting said members for rotation, a pair of spaced material-engaging grill plates mounted on said supporting members and a companion grill plate cooperable with each of said pair of material-engaging grill plates to retain the material to be grilled between the material-engaging grill plates and the companion grill plates, said companion grill plates being movable relative to said material-engaging grill plates, said supporting means having serrated extensions, rotary adjusting means on said companion grill plates having spiral flanges cooperating with the teeth of said serrated extensions to secure movement of said companion grill plates relative to said supporting means and thereby relative to said material-engaging grill plates.

10. In a grill structure, a pair of spaced supporting members, means for supporting said members for rotation, a pair of spaced material-engaging grill plates carried by said supporting members and a companion grill plate cooperable with each of said pair of material engaging grill plates to retain the material to be grilled between the material-engaging grill plates and the companion grill plates, said companion grill plates being movable toward and away from said material-engaging grill plates, said supporting means having toothed extensions, rotary adjusting means on said companion grill plates having spiral flanges cooperating with the teeth thereof.

11. In a grill structure, a pair of spaced supporting members, means for supporting said members for rotation, a pair of spaced material-engaging grill plates carried by said supporting members and a companion grill plate cooperable with each of said pair of material engaging grill plates to retain the material to be grilled between the material-engaging grill plates and the companion grill plates, said companion grill plates being movable toward and away from said material-engaging grill plates, said supporting means having toothed extensions, rotary adjusting means on said companion grill plates having spiral flanges cooperating with the teeth thereof, one of said material-engaging grill plates being removable whereby to engage relatively thick pieces of material between the inner surface of the other material engaging grill plate and the companion grill plate for the material engaging grill plate which is removable.

12. In a grill structure, a pair of spaced supporting members, means for supporting said members for rotation, a pair of spaced material-engaging grill plates mounted on said supporting members and a companion grill plate cooperable with each of said pair of material-engaging grill plates to retain the material to be grilled between the material-engaging grill plates and the companion grill plates, said companion grill plates being movable relative to said material-engaging grill plates, said supporting means having serrated extensions, rotary adjusting means on said companion grill plates having spiral flanges cooperating with the teeth of said serrated extensions to secure movement of said companion grill plates relative to said supporting means and thereby relative to said material-engaging grill plates, one of said material-engaging grill plates being removable relative to said supporting members.

13. In a grill structure, a grill plate, a companion grill plate cooperable therewith to support material to be grilled between the two, said companion grill plate being adjustable toward and away from said first grill plate and rotating wedge means for effecting such adjustment.

14. In a grill structure, a pair of oppositely disposed independent supporting means for supporting relatively flat pieces of material to be grilled in spaced face-to-face relation and means for supporting said supporting means for rotation about an axis lying between said pieces of material.

GUS G. GARVIS.